US008492502B2

(12) United States Patent
Lee et al.

(10) Patent No.: US 8,492,502 B2
(45) Date of Patent: Jul. 23, 2013

(54) METHOD FOR PRODUCTION OF POLYARYLENE SULFIDE RESIN WITH EXCELLENT LUMINOSITY AND THE POLYARYLENE SULFIDE RESIN

(75) Inventors: Young-Rok Lee, Seoul (KR); Il-Hoon Cha, Anyang (KR); Jun-Sang Cho, Yongin (KR)

(73) Assignee: SK Chemicals Co., Ltd. (KR)

( * ) Notice: Subject to any disclaimer, the term of this patent is extended or adjusted under 35 U.S.C. 154(b) by 423 days.

(21) Appl. No.: 12/518,243

(22) PCT Filed: Jan. 4, 2008

(86) PCT No.: PCT/KR2008/000051
§ 371 (c)(1),
(2), (4) Date: Jun. 8, 2009

(87) PCT Pub. No.: WO2008/082267
PCT Pub. Date: Jul. 10, 2008

(65) Prior Publication Data
US 2010/0105845 A1  Apr. 29, 2010

(30) Foreign Application Priority Data

Jan. 5, 2007  (KR) .................. 10-2007-0001327

(51) Int. Cl.
*C08G 75/00* (2006.01)
(52) U.S. Cl.
USPC ........................ 528/226; 528/388; 528/389
(58) Field of Classification Search
USPC ......................................... 528/226, 388, 389
See application file for complete search history.

(56) References Cited

U.S. PATENT DOCUMENTS

| | | | |
|---|---|---|---|
| 2,513,188 A | 6/1950 | Douglas | |
| 2,583,941 A | 1/1952 | Gordon, Jr. | |
| 4,746,758 A | 5/1988 | Rule et al. | |
| 4,760,128 A | 7/1988 | Ebert et al. | |
| 4,786,713 A | 11/1988 | Rule et al. | |
| 4,945,155 A | 7/1990 | Fagerburg et al. | |
| 4,952,671 A | 8/1990 | Fagerburg et al. | |
| 5,064,937 A | 11/1991 | Fagerburg et al. | |

FOREIGN PATENT DOCUMENTS

| | | |
|---|---|---|
| JP | 62-041225 | 2/1987 |
| JP | 01-188529 | 7/1989 |
| JP | 02-194054 A2 | 7/1990 |
| JP | 03-500901 | 2/1991 |
| JP | 03-502463 | 6/1991 |
| JP | 03-502586 | 6/1991 |
| JP | 03-504391 | 9/1991 |
| JP | 03-506047 | 12/1991 |
| JP | 04-503967 | 7/1992 |
| JP | 04-506228 | 10/1992 |
| JP | 05-501732 | 4/1993 |
| JP | 2009-138206 | 6/2009 |
| JP | 2010-501661 | 1/2010 |
| JP | 2010-515781 | 5/2010 |
| KR | 10-0142100 | 3/1998 |
| WO | WO89/04338 | 5/1989 |
| WO | WO1989/003850 | 5/1989 |
| WO | WO89/05324 | 6/1989 |
| WO | WO89/11498 | 11/1989 |
| WO | WO90/00575 | 1/1990 |
| WO | WO90/10664 | 9/1990 |
| WO | WO90/15837 | 12/1990 |
| WO | WO91/08249 | 6/1991 |
| WO | WO 2008/023915 | 6/1998 |
| WO | WO 2004/060973 | 7/2004 |
| WO | WO 2008/082265 | 7/2008 |

OTHER PUBLICATIONS

International Search Report prepared by the Korean Intellectual Property Office on Apr. 16, 2008, for International Application No. PCT/KR2008/000051.
Written Opinion prepared by the Korean Intellectual Property Office on Apr. 16, 2008, for International Application No. PCT/KR2008/000051.

*Primary Examiner* — Edward Cain
(74) *Attorney, Agent, or Firm* — Sheridan Ross P.C.

(57) ABSTRACT

The present invention relates to a process of producing polyarylene sulfide (PAS) and PAS resin produced therefrom, and more specifically, to a process of preparing polyarylene sulfide with better thermal properties and luminosity than conventional PAS and the PAS resin produced therefrom, including the steps of: a) melting and mixing a composition including solid sulfur, iodinated aryl compounds, and a polymerization terminator; b) polymerizing the molten mixture of step a) for 1 to 30 hours while increasing the temperature and decreasing the pressure from initial reaction conditions of a temperature of 180 to 250° C. and a pressure of 50 to 450 Torr to final reaction conditions of a temperature of 270 to 350° C. and a pressure of 0.001 to 20 Torr; and c) heating the reaction product of step b) at a temperature of 270 to 350° C. for 1 to 25 hours. The process of polyarylene sulfide resin further includes a step of heating the polymerized product at a high temperature following the polymerization step, and uses the polymerization terminator in a suitable amount to control the molecular weight of polyarylene sulfide, thereby producing polyarylene sulfide with excellent thermal properties and luminosity.

7 Claims, No Drawings

METHOD FOR PRODUCTION OF POLYARYLENE SULFIDE RESIN WITH EXCELLENT LUMINOSITY AND THE POLYARYLENE SULFIDE RESIN

CROSS REFERENCE TO RELATED APPLICATIONS

This application is a national stage application under 35 U.S.C. 371 of PCT Application No. PCT/KR2008/000051 having an international filing date of 4 Jan. 2008, which designated the United States, which PCT application claimed the benefit of South Korean Application No. 10-2007-0001327 filed 5 Jan. 2007, the entire disclosure of each of which are hereby incorporated herein by reference.

BACKGROUND OF THE INVENTION (a) Field of the Invention

The present invention relates to a method of producing polyarylene sulfide (PAS) and PAS resin produced therefrom, and more specifically, to a method of producing PAS resin with better thermal properties and luminosity than conventional PAS and the PAS resin produced therefrom.

(b) Description of the Related Art

PAS resin is one of representative engineering plastics, and has excellent physical properties such as heat resistance, chemicals resistance, flame resistance, and electrical insulating properties. PAS resin can be widely used for computer accessories, automobile accessories, coatings for parts contacting corrosive chemicals, and industrial fibers with chemical resistance. At present, only polyphenylene sulfide of PAS resins is commercially available.

The representative method of preparing PPS resin is a Macullum process, in which PPS resin is synthesized by polymerizing an aromatic dichloride compound and sulfides in a polar organic solvent, as described in U.S. Pat. No. 2,513,188 and U.S. Pat. No. 2,583,941.
(Macullum Process)

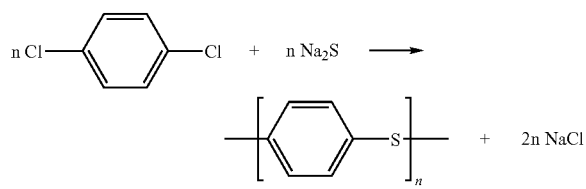

As seen from the reaction scheme, p-dichlorobenzene and sodium sulfide are polymerized in a polar organic solvent such as N-methylpyrrolidone to produce PPS resin and NaCl as a by-product.

The PPS resin synthesized in the Macullum process has a narrow range of application due to a molecular weight of 10,000 to 40,000 and melt viscosity of 3000 Poise or lower, resulting in narrow applications and it cannot be applied with post-treatment. That is, to improve the melt viscosity of PPS resin, the synthesized PPS resin is further cured at a temperature of lower than the melting temperature (Tm) of PPS resin. The melt viscosity of PPS resin oxidation increases due to oxidation, crosslinking, and polymer chain extension in the curing step.

However, disadvantages of the Macullum process are as follows. First, the use of sulfides such as sodium sulfide produces a large amount of a by-product (metal salt). In the case of using sodium sulfide, the amount of produced by-product is 52 weight % with respect to the weight of the starting material, thereby resulting in difficulty in treating the by-product and a low yield of PPS resin. In addition, the by-product remains in PPS resin at several ppm to several thousands of ppm, and increases electrical conductivity, causes corrosion of machines, and problems in spinning fiber. Second, the Macullum process adopts a solution polymerization method, and thus produces PPS resin in a very fine powder form with a low apparent density, thereby causing disadvantages in transportation and manufacturing processes. Third, the brittleness of PPS resin increases in a curing process for improving the melt viscosity of PPS resin, and thus lowers the mechanical properties such as impact strength and causes the color of PPS to be dark.

There have been many suggestions to resolve such problems, and these include a composition and method for preparing PPS resin described in U.S. Pat. No. 4,746,758 and U.S. Pat. No. 4,786,713. In the composition and method, diiodo-aryl compounds and solid sulfur instead of dichloride compounds and sulfides are polymerized by being directly heated in the absence of a polar organic solvent. The preparation method includes an iodination and polymerization step.

The aryl compounds are reacted with iodine to obtain diiodo-aryl compounds in the iodination step, followed by polymerization of the diiodo-aryl compounds with solid sulfur over a nitro compound catalyst to produce PAS resin. Iodine generated in gas formed in the process is recovered and reused for the iodination process. The iodine is substantially a catalyst.

The method can resolve the problems of the conventional Macullum process. That is, because iodine is the by-product of the process and can be easily recovered, the electrical conductivity is not increased and the amount of iodine remaining in the final product is very low, and waste is reduced due to reuse of the recovered iodine. In addition, since an organic solvent is not used in the polymerization process, the final resin can be obtained in a pellet form, thereby avoiding the problems of the fine powder.

The PAS resin obtained in the process has a higher molecular weight than that of the Macullum process, and thus needs not be cured.

However, the composition and method for preparing PAS resin has some problems as follows. First, because residual iodine molecules are corrosive, even a small amount of iodine remaining in the final PAS resin can cause problems in manufacturing machines, and the dark color of iodine makes the resultant PAS resin dark. Second, as solid sulfur is used in the polymerization process, disulfide bonds included in the resultant PAS resin deteriorate the thermal properties of the resin. Third, not using the nitro compound catalyst makes the resin light, but deteriorates the thermal properties compared to when using a catalyst due to an increase in the disulfide bond content.

SUMMARY OF THE INVENTION

To resolve the problems of the conventional technique, an object of the present invention is to provide a polyarylene sulfide with improved thermal properties and luminosity.

Another object of the present invention is to provide a process of preparing the PAS resin.

A further object of the present invention is to provide resin articles manufactured from the polyarylene sulfide resin such as molded articles, films, sheets, or fibers.

DETAILED DESCRIPTION OF THE PREFERRED EMBODIMENTS

These and other objects of the invention will be more fully understood from the following description of the invention, the referenced drawings attached hereto, and the claims appended hereto.

The present invention relates to a process of preparing polyarylene sulfide, including the steps of:

a) melting and mixing a composition including a sulfur compound, iodinated aryl compounds, and a polymerization terminator;

b) polymerizing the molten mixture of step a) for 1 to 30 hours while increasing the temperature and decreasing the pressure from initial reaction conditions of a temperature 180 to 250° C. and a pressure 50 to 450 Torr to final reaction conditions of a temperature 270 to 350° C. and a pressure 0.001 to 20 Torr; and c) heating the reaction product of step b) at a temperature of 270 to 350° C. for 1 to 25 hours.

In an embodiment, the step c) is preferably carried out so that the rate of viscosity increase represented by Formula 1 is lower than 10 percent (%):

$$\text{rate of viscosity increase (\%)} = \frac{\text{viscosity of reaction product of step } c)}{\text{viscosity of reaction product of step } b)} \times 100 \quad \text{Formula 1}$$

The composition includes 100 parts by weight of the solid sulfur, 500 to 10,000 parts by weight of the iodinated aryl compounds, and 1 to 30 parts by weight of a polymerization terminator with respect to 100 parts by weight of the solid sulfur.

Preferably, the polymerization terminator is at least one selected from the group consisting of a monoiodoaryl compound, benzothiazole, benzothiazolesulfenamide, thiuram, and dithiocarbamate.

In addition, the present invention provides a polyarylene sulfide resin that is prepared by a process according to any one of claim 1 to claim 7, and has a melting temperature (Tm) of 230 to 290° C., and luminosity, melting temperature, and melt viscosity satisfying Formula 2:

$$\text{Col-}L \geq -0.55 \times \left(T_m + 2.7 \log_{10} \frac{MV}{900}\right) + 197 \quad \text{Formula 2}$$

Herein, Col-L is a luminosity defined by the CIE Lab color model, Tm is a melting temperature indicated by the Celsius temperature scale (° C.), and MV is a melt viscosity defined as poise.

The present invention will now be described in more detail.

While studying an improvement method of luminosity or color of PAS resin, the present inventors found that in the process of preparing the PAS resin starting from solid sulfur and iodinated aryl compounds, volatile compounds including molecular iodine were the primary cause of darkening the color of PAS resin, and thus a heating step at a high temperature following the polymerization step removed the volatile compounds. In addition, they found that, to prevent an increase of molecular weight of PAS in the heating step, a polymerization terminator was added to a mixture to be polymerized. Thus, an improvement in luminosity as defined by the CIE Lab color model was achieved while minimizing a decrease of other properties of PAS resin.

The process of preparing PAS resin includes the steps of:

a) melting and mixing a composition including solid sulfur, iodinated aryl compounds, and a polymerization terminator;

b) polymerizing the molten mixture of step a) for 1 to 30 hours while increasing the temperature and decreasing the pressure from initial reaction conditions of a temperature 180 to 250° C. and a pressure 50 to 450 Torr to final reaction conditions of a temperature 270 to 350° C. and a pressure 0.001 to 20 Torr; and c) heating the reaction product of step b) at a temperature of 270 to 350° C. for 1 to 25 hours.

In the present invention, the process includes a step of a) melting and mixing a composition including solid sulfur, iodinated aryl compounds, and a polymerization terminator.

The sulfur compounds and iodinated aryl compounds used in step a) are not particularly limited, and can be compounds that can be selected and used by the skilled person in the art.

Preferably, sulfur (S) exits cyclooctasulfur (S8) at room temperature, and the sulfur compounds can be any sulfur compound as long as it is in solid or liquid form at room temperature.

The iodinated aryl compounds include at least one selected from diiodobenzene (DIB), diiodonaphthalene, diiodobiphenyl, diiodobisphenol, and diiodobenzophenone. The derivatives of iodinated aryl compounds are also used by linking an alkyl group or sulfone group, or by including oxygen or nitrogen. Depending upon position of iodine atoms in iodinated aryl compounds, different isomers are classified, and the preferable examples of these isomers are compounds such as p-diiodobenzene (pDIB), 2,6-diiodo naphthalene, and p,p'-diiodobiphenyl, where iodine atoms exist symmetrically at both ends of the aryl compounds.

The amount of iodinated aryl compound is 500 to 10,000 parts by weight based on 100 parts by weight of sulfur. The amount is determined in consideration of generation of disulfide bonds.

The polymerization terminator is contained in an amount of 1 to 30 parts by weight based on 100 parts by weight of sulfur. That is, the amount is preferably determined to achieve the minimal thermal property of PAS resin and improved luminosity with a reasonable cost.

The polymerization terminator contained in the composition of step a) is used for controlling the molecular weight of PAS resin, and particularly it prevents the molecular weight from increasing over a suitable range. If the molecular weight of the PAS resin is excessively high, it puts too much load upon a reactor and causes the processing of resin to be difficult.

The exemplary polymerization terminator is at least one selected from the group consisting of a monoiodoaryl compound, benzothiazole, benzothiazolesulfenamide, thiuram, and dithiocarbamate.

More preferably, the polymerization terminator is at least one selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N-dicyclohexylbenzothiazole-2-sulfenamide, tetramethylthiuram monosulfide, tetramethylthiuram disulfide, zinc dimethyldithiocarbamate, and zinc diethyldithiocarbamate.

The composition of step a) further includes at least a polymerization catalyst. The present inventors found that the nitro compounds were a main cause of darkening the color of PAS resin, and that even though the nitro compounds were used in a much lesser amount, an equal or better thermal property and improved luminosity were achieved by using the sulfur-containing polymerization terminator.

The polymerization catalyst can generally be any nitrobenzene derivatives. Preferably, a polymerization catalyst selected from the group consisting of 1,3-diiodo-4-nitrobenzene (mDINB), 1-iodo-4-nitrobenzene, 2,6-diiodo-4-nitrophenol, and 2,6-diiodo-4-nitrobenzene is used.

The polymerization catalyst is contained at 0.01 to 20 parts by weight with respect to 100 parts by weight of the solid sulfur, in consideration of an extent of improvement in polymerization reaction, and cost.

The composition in step a) is heated to melt all components, and mixed homogeneously.

In the following step, the method includes step b) of polymerizing the molten mixture of step a).

The reaction conditions of the polymerization are not particularly limited because they depend on reactor structure and productivity, and are known to a skilled person in the art. The reaction conditions can be selected by a skilled person in the art in consideration of the process conditions.

The polymerization of the molten mixture of step a) is performed for 1 to 30 hours while increasing the temperature and decreasing the pressure from initial reaction conditions of a temperature 180 to 250° C. and a pressure 50 to 450 Torr to final reaction conditions of a temperature 270 to 350° C. and a pressure 0.001 to 20 Torr. Preferably, the initial reaction conditions are set to a temperature of 180° C. or higher and a pressure of 450 Torr or lower in consideration of the reaction rate, and the final reaction conditions are set to a temperature of 350° C. or lower and a pressure of 450 Torr or lower in consideration of the pyrolsis of the polymer.

In step b), the polymerization is performed for 2 to 20 hours, and more preferably for 3 to 15 hours, while increasing the temperature and decreasing the pressure from initial reaction conditions of a temperature of 190 to 240° C. and more preferably of 200 to 240° C. and a pressure of 80 to 350 Torr and more preferably of 90 to 300 Torr to final reaction conditions of a temperature of 280 to 340° C. and more preferably of 290 to 335° C. and a pressure of 0.005 to 15 Torr and more preferably of 0.01 to 10 Torr.

In the following step, the method includes a step of heating the reaction product of step b) at a temperature of 270 to 350° C. for 1 to 25 hours. The heating is carried out to improve the luminosity by removing volatile compounds such as molecular iodine.

The reaction conditions of step c) are selected in consideration of an improvement in luminosity and a minimal time and temperature for removing volatile compounds, and are preferably a temperature of 270 to 350° C. for 1 to 25 hours, more preferably of 285 to 340° C. for 1.5 to 20 hours, and most preferably of 300 to 330° C. for 2 to 15 hours.

When the reaction product obtain from step b) is heated, the viscosity of PAS resin increases excessively, which is confirmed by measurement of the viscosity increase. That is, the step c) is carried out so that the rate of viscosity increase represented by Formula 1 is lower than 10 percent (%):

$$\text{rate of viscosity increase}(\%) = \frac{\text{viscosity of reaction product of step } c)}{\text{viscosity of reaction product of step } b)} \times 100 \quad \text{Formula 1}$$

More preferably, the heating of step c) is carried out so that the molecular weight of PAS resin becomes 10,000 to 55,000. To achieve the molecular weight of PAS resin, the polymerization terminator is contained, preferably at 1 to 30 parts by weight based on 100 parts by weight of sulfur.

In another embodiment, the present invention provides a PAS resin prepared the process of the present invention.

In the process of preparing PAS resin, the heating step after the polymerization is added, and the molecular weight of the product is controlled by adding a suitable amount of the polymerization terminator. Thus, the PAS resin has better thermal properties and luminosity defined by the CIE Lab color model.

In other words, because the PAS resin is prepared by the process of the present invention, it has a melting temperature (Tm) of 230 to 290° C., luminosity, and a melting temperature and a melt viscosity satisfying Formula 2:

$$Col\text{-}L \geq -0.55 \times \left(T_m + 2.7 \log_{10} \frac{MV}{900}\right) + 197 \quad \text{Formula 2}$$

Herein, Col-L is a luminosity defined by the CIE Lab color model, Tm is a melting temperature indicated by the Celsius temperature scale (° C.), and MV is a melt viscosity defined as poise.

In a still further embodiment, the present invention provides a resin article manufactured from the polyarylene sulfide resin, where the article is a molded article, a film, a sheet, or a fiber.

The article is manufactured with a mixture of i) 30 to 99.9 wt % of the polyarylene sulfide resin, and ii) 0.1 to 70 wt % of a polyarylene sulfide resin synthesized from a metal sulfide and a dichlorinated aryl compound according to the Macullum process. In addition, the article is manufactured with a mixture of i) 30 to 99.9 wt % of the polyarylene sulfide resin, and ii) 0.1 to 70 wt % of a polyarylene sulfide resin that is synthesized from sulfur and an iodoaryl compound and satisfies Formula 3:

$$Col\text{-}L < -0.55 \times \left(T_m + 2.7 \log_{10} \frac{MV}{900}\right) + 197 \quad \text{Formula 3}$$

Herein, Col-L is a luminosity defined by the CIE Lab color model, Tm is a melting temperature indicated by the Celsius temperature scale (° C.), and MV is a melt viscosity defined as poise.

The article can be a molded article manufactured by injection molding, extrusion molding, and other molding process. The molded articles include injection molded articles, extrusion molded articles, or blowing molded articles. In the injection molding process, the temperature of the mold is 30° C. or higher, more preferably 60° C. or higher, and most preferably 80° C. or higher in a crystallization aspect, and in terms of deformation of a test piece, the temperature is 150° C. or lower, more preferably 140° C. or lower, and most preferably 130° C. or lower. The article can be applied to parts of electrical and electronic systems, architecture, automobiles, machines, and articles for daily use.

The films or sheets are undrawn films or sheets, monoaxially-oriented films or sheets, and biaxially-oriented films or sheets. The fibers are undrawn fiber, drawn fiber, super-drawn fiber, etc., and can be used for woven fabrics, knitted fabrics, non-woven fabrics such as spun-bond, melt-blow, and staple, rope, and net.

The PAS resin of the present invention is further processed by blending with the PAS resin produced according to the Macullum process to adopt the rapid crystallization property.

Alternatively, the PAS resin of the present invention is further processed by blending with a PAS resin synthesized from iodine compounds according to preparation methods other than the present invention, thereby adopting the advantages of rapid crystallization and high luminosity of the PAS resin of the present invention.

The present invention is further explained in more detail with reference to the following examples. These examples, however, should not be interpreted as limiting the scope of the present invention in any manner.

A. Preparation of Polyarylene Sulfide Resin without a Polymerization Catalyst

Comparative Example 1

A mixture of 300.0 g of p-diiodobenzene (pDIB), and 29.15 g of solid sulfur was melted at 180° C.

The molten mixture was polymerized for 8 hours in total to produce PAS resin as follows: at 220° C. and 350 Torr for 1 hour; at 230° C. and 200 Torr for 2 hours; at 250° C. and 120 Torr for 1 hour; at 60 Torr for 1 hour; at 280° C. for 1 hour; at 10 Torr for 1 hour; and at 300° C. and 1 Torr or lower for 1 hour.

Comparative Example 2

PAS resin was produced by substantially the same method of Comparative Example 1, except that 1.48 g of 4-iodobiphenyl as a polymerization terminator was added to the mixture.

Example 1

PAS resin was produced by substantially the same method of Comparative Example 2, except that the polymerization product was further heated at 300° C. for 3 hours.

Example 2

PAS resin was produced by substantially the same method of Comparative Example 2, except that the polymerization product was further heated at 300° C. for 12 hours.

Example 3

PAS resin was produced by substantially the same method of Comparative Example 2, except that the polymerization product was further heated at 320° C. for 2 hours.

Example 4

PAS resin was produced by substantially the same method of Example 3, except that the polymerization product was further heated at 320° C. for 6 hours.

Test Example 1

The melt viscosity (MV), melting temperature (Tm), and luminosity (Col-L) of PAS resin obtained by Comparative Examples 1 and 2 and Examples 1 to 4 were measured and are shown in Table 1.

The melt viscosity was measured with a rotating disk viscometer at 300° C., the melting temperature was measured with a Differential Scanning Calorimeter (DSC), and color analysis was performed by granulating the obtained polymer and test piece with a size of about 100 ea/g, crystallizing at 170° C. for 1 hour, and measuring luminosity defined by the CIE Lab color model with a colorimeter. The luminosity was calculated according to a Hunter L,a,b on the basis of color defined by the International Commission on Illumination (CIE) as an international standard, and the definition and provision are specifically described in items E 308 and E 1347 of ASTM.

TABLE 1

| Classification | Melting temperature (° C.) | Luminosity (Col-L) | Melt viscosity (MV) |
|---|---|---|---|
| Comparative Example 1 | 230.1 | 66.7 | 1030 |
| Comparative Example 2 | 233.1 | 68.0 | 970 |
| Example 1 | 232.6 | 70.1 | 906 |
| Example 2 | 232.3 | 72.2 | 1170 |
| Example 3 | 232.0 | 72.3 | 1006 |
| Example 4 | 231.4 | 74.0 | 1730 |

As shown in Table 1, Examples 1 to 4 that adopted the additional heating step following the polymerization step showed polymers with similar melting temperatures and improved luminosity compared to those of Comparative Examples 1 and 2.

B. Preparation of Polyarylene Sulfide Resin with a Polymerization Catalyst

Comparative Example 3

PAS resin was produced by substantially the same method of Comparative Example 1, except that 10.30 g of 1,3-diiodo-4-nitrobenzene, (mDINB) as a polymerization catalyst was added to the mixture to be polymerized.

Comparative Example 4

PAS resin was produced by substantially the same method of Comparative Example 3, except that 0.88 g of 2,2'-dithiobisbenzothiazole (MBTS) as a polymerization terminator was added to the mixture.

Example 5

PAS resin was produced by substantially the same method of Comparative Example 4, except that the polymerization product was further heated at 300° C. for 3 hours.

Comparative Example 5

PAS resin was produced by substantially the same method of Comparative Example 4, except that the polymerization product was further heated at 300° C. for 30 minutes.

Comparative Example 6

PAS resin was produced by substantially the same method of Comparative Example 3, except that 1.10 g of 2,2'-dithiobisbenzothiazole (MBTS) as a polymerization terminator was added to the mixture.

Example 6

PAS resin was produced by substantially the same method of Comparative Example 6, except that the polymerization product was further heated at 300° C. for 3 hours.

Example 7

PAS resin was produced by substantially the same method of Comparative Example 6, except that the polymerization product was further heated at 300° C. for 7 hours.

Example 8

PAS resin was produced by substantially the same method of Comparative Example 6, except that the polymerization product was further heated at 300° C. for 12 hours.

Comparative Example 7

PAS resin was produced by substantially the same method of Comparative Example 4, except that the polymerization product was further heated at 300° C. for 15 minutes.

Test Example 2

According to substantially the same method of Test Example 1, the melt viscosity (MV), melting temperature (Tm), and luminosity (Col-L) of PAS resin obtained by Comparative Examples 3 to 7 and Examples 5 to 8 were measured and are shown in Table 2.

TABLE 2

| Classification | Melting temperature (° C.) | Luminosity (Col-L) | Melt viscosity (MV) |
|---|---|---|---|
| Comparative Example 3 | 254.6 | 47.9 | 1019 |
| Comparative Example 4 | 265.7 | 48.3 | 995 |
| Example 5 | 265.6 | 50.9 | 1024 |
| Comparative Example 5 | 266.3 | 46.0 | 381 |
| Comparative Example 6 | 266.8 | 48.9 | 963 |
| Example 6 | 265.0 | 51.8 | 1011 |
| Example 7 | 264.9 | 54.4 | 940 |
| Example 8 | 264.3 | 55.2 | 1590 |
| Comparative Example 7 | 266.8 | 45.3 | 192 |

As shown in Table 2, the polymer obtained from Comparative Example 3 further including the polymerization catalyst, and the polymers obtained from Comparative Examples 4 and 5 further including the polymerization terminator showed an improved thermal property (melting temperature) and deteriorated luminosity, compared to that of Comparative Example 1.

Furthermore, Examples 5 to 8 that adopted the additional heating step following the polymerization step showed the polymers with similar melting temperatures and improved luminosity compared to those of Comparative Examples 3 to 7.

C. Production of Injection Molded Product

Example 9

A test piece was produced from 1 kg of PAS resin of Example 8 with a catapult (ENGEL ES75P), and a tensile property test was carried out according to ASTM D638. In the process, the barrel temperature was 270° C., 300° C., and 300° C. in order from feed opening, and the nozzle temperature was 310° C. As a result, tensile strength was 11,000 psi, tensile modules were 830,000 psi, and elongation at break was 1.2%, which satisfied the properties of PAS resin.

Comparative Example 8

A test piece was produced from 3 kg of PAS resin of Comparative Example 3 according to substantially the same method as Example 9.

Comparative Example 9

According to substantially the same method as Example 9, a test piece was produced from 3 kg of Ryton resin that was commercially available, and a representative PPS obtained by the Macullum process.

Example 10

According to substantially the same method as Example 9, a test piece was produced from a dry-blend of 2.85 kg of the PAS resin of Example 8 and 0.15 kg of the PAS resin of Comparative Example 3.

Example 11

According to substantially the same method as Example 9, a test piece was produced from a dry-blend of 2.7 kg of the PAS resin of Example 8 and 0.3 kg of the PAS resin of Comparative Example 3.

Example 12

According to substantially the same method as Example 9, a test piece was produced from a dry-blend of 1.5 kg of the PAS resin of Example 8 and 1.5 kg of the PAS resin of Comparative Example 3.

Example 13

According to substantially the same method as Example 9, a test piece was produced from a dry-blend of 2.85 kg of the PAS resin of Example 8 and 0.15 kg of the Ryton resin of Comparative Example 9.

Example 14

According to substantially the same method as Example 9, a test piece was produced from a dry-blend of 2.7 kg of the PAS resin of Example 8 and 0.3 kg of the Ryton resin of Comparative Example 9.

Example 15

According to substantially the same method as Example 9, a test piece was produced from a dry-blend of 1.5 kg of the PAS resin of Example 8 and 1.5 kg of the Ryton resin of Comparative Example 9.

Test Example 3

The melting temperature (Tm), luminosity (Col-L), cold crystallization temperature (Tcc), and crystallinity of PAS test pieces obtained by Comparative Examples 8 to 9 and Examples 9 to 15 were measured and are shown in Table 3.

The melting temperature and cold crystallization temperature were measured with a differential scanning calorimeter, and color analysis was performed by granulating the obtained polymer and test piece with a size of about 100 ea/g, crystallizing at 170° C., for 1 hour, and measuring luminosity defined by the CIE Lab color model with a colorimeter. The luminosity was calculated according to a Hunter L,a,b on the basis of color defined by the International Commission on Illumination (CIE) as a international standard, and the definition and provision are specifically described in items E 308 and E 1347 of ASTM.

The density of the test piece was measured with a density gradient column, and then calculated by the following formula to obtain crystallinity:

$$X_{c,V}\ (\%) = \frac{d - d_c}{d_a - d_c} \times 100$$

wherein $X_{c,V}$ is crystallinity rate of the test piece;
d is density of the test piece;
$d_c$ is theoretical density of PAS resin in complete crystal form; and
$d_a$ is density of PAS resin in complete amorphous form.
PPS resin has a $d_c$ of 1.439 and a $d_a$ of 1.320.

TABLE 3

| Classification | Resin (used amount) | | Tm (° C.) | Tcc (° C.) | Col-L | Crystallinity (v/v %) |
|---|---|---|---|---|---|---|
| Example 9 | Example 8 (3 kg) | | 265.0 | 185.6 | 54.9 | 28.5 |
| Comparative Example 8 | Comparative Example 3 (3 kg) | | 254.2 | 170.8 | 47.1 | 14.1 |
| Comparative Example 9 | Ryton resin (3 kg) | | 277.1 | 243.2 | 32.4 | 37.3 |
| Example 10 | Example 8 (2.85 kg) | Comparative Example 3 (0.05 kg) | 264.4 | 184.9 | 54.7 | 28.6 |
| Example 11 | Example 8 (2.7 kg) | Comparative Example 3 (0.3 kg) | 263.5 | 184.1 | 54.2 | 27.6 |
| Example 12 | Example 8 (1.5 kg) | Comparative Example 3 (1.5 kg) | 258.7 | 178.2 | 51.6 | 19.4 |
| Example 13 | Example 8 (2.85 kg) | Ryton resin (0.15 kg) | 274.3 | 234.6 | 53.5 | 34.7 |
| Example 14 | Example 8 (2.7 kg) | Ryton resin (0.3 kg) | 276.8 | 240.5 | 52.4 | 36.8 |
| Example 15 | Example 8 (1.5 kg) | Ryton resin (1.5 kg) | 277.0 | 242.4 | 43.2 | 36.8 |

When the injection molded articles of Example 9 and Comparative Examples 8 to 9 were compared with the injection molded articles of Examples 10 to 12 and Examples 13 to 15 starting from the dry-blend, the articles of Examples 10 to 12 showed improved luminosity of Example 8, and the articles of Examples 13 to 15 represented a very high crystalline rate, and increased crystallinity.

As described above, the process of polyarylene sulfide resin further includes a step of heating the polymerized product at a high temperature following the polymerization step, and uses the polymerization terminator in a suitable amount to control a molecular weight of polyarylene sulfide, thereby producing PAS resin with excellent thermal properties and luminosity.

What is claimed is:

1. A process of preparing polyarylene sulfide comprising the steps of:
   a) melting and mixing a composition comprising solid sulfur, iodinated aryl compounds, and a polymerization terminator;
   b) polymerizing the molten mixture of step a) for 1 to 30 hours while increasing the temperature and decreasing the pressure from initial reaction conditions of a temperature of from about 180 to 250° C. and a pressure of from about 50 to 450 Torr to final reaction conditions of a temperature of from about 270 to 350° C. and a pressure of from about 0.001 to 20 Torr; and
   c) after the polymerization step of b), heating the reaction product of step b) at a temperature of from about 285° C. to 340° C. for 1.5 to 20 hours.

2. The process of preparing polyarylene sulfide according to claim 1, wherein the step c) is carried out so that the rate of viscosity increase represented by Formula 1 is lower than 10 percent (%):

$$\text{rate of viscosity increase (\%)} = \frac{\text{viscosity of reaction product of step } c)}{\text{viscosity of reaction product of step } b)} \times 100. \quad \text{Formula 1}$$

3. The process of preparing polyarylene sulfide according to claim 1, wherein the composition comprises about 100 parts by weight of the solid sulfur, 500 to 10,000 parts by weight of the iodinated aryl compounds, and 1 to 30 parts by weight of the polymerization terminator with respect to 100 parts by weight of the solid sulfur.

4. The process of preparing polyarylene sulfide according to claim 1, wherein the polymerization terminator is at least one selected from the group consisting of a monoiodoaryl compound, benzothiazole, benzothiazolesulfenamide, thiuram, and dithiocarbamate.

5. The process of preparing polyarylene sulfide according to claim 4, wherein the polymerization terminator is at least one selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N-dicyclohexylbenzothiazole-2-sulfenamide, tetramethylthiuram monosulfide, tetramethylthiuram disulfide, zinc dimethyldithiocarbamate, and zinc diethyldithiocarbamate.

6. The process of preparing polyarylene sulfide according to claim 1, wherein the composition further comprises at least a polymerization catalyst selected from the group consisting of 1,3-diiodo-4-nitrobenzene (mDINB), 1-iodo-4-nitrobenzene, 2,6-diiodo-4-nitrophenol, and 2,6-diiodo-4-nitrobenzene.

7. The process of preparing polyarylene sulfide according to claim 6, wherein the polymerization catalyst is contained at about 0.01 to 20 parts by weight with respect to 100 parts by weight of the solid sulfur.

* * * * *